Feb. 7, 1939.  G. G. SOMERVILLE  2,146,600
ARC WELDING
Filed Oct. 23, 1936  2 Sheets-Sheet 1
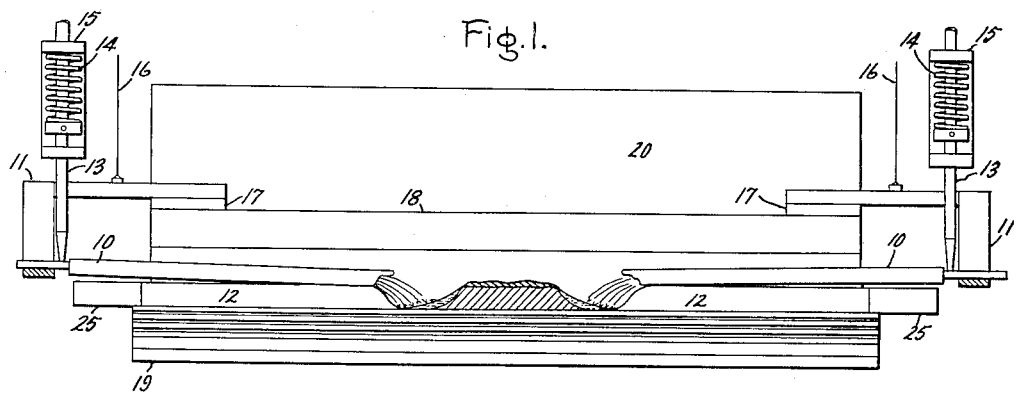
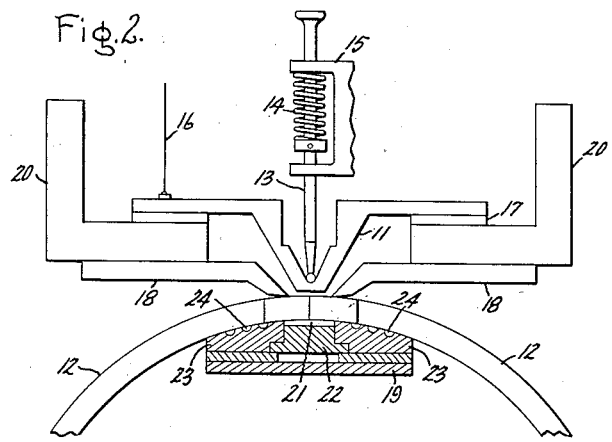
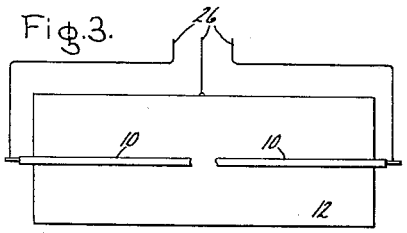
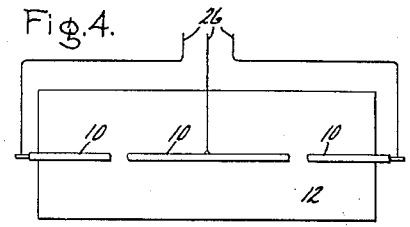
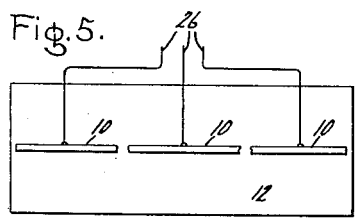
Inventor:
Gareth G. Somerville,
by Harry E. Dunham
His Attorney.

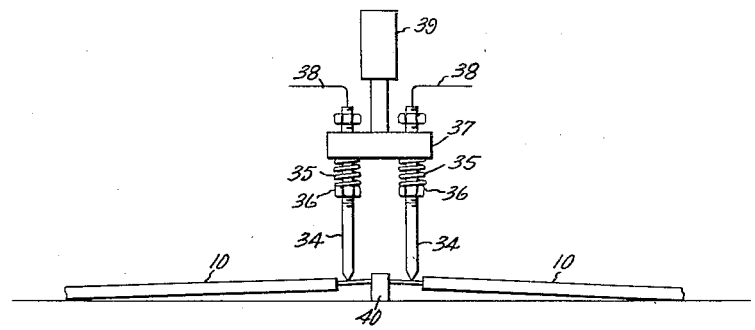
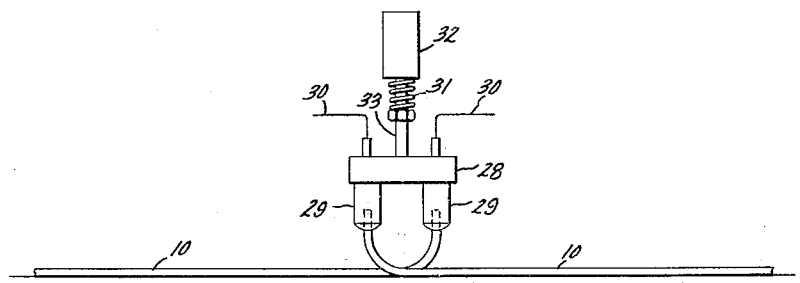
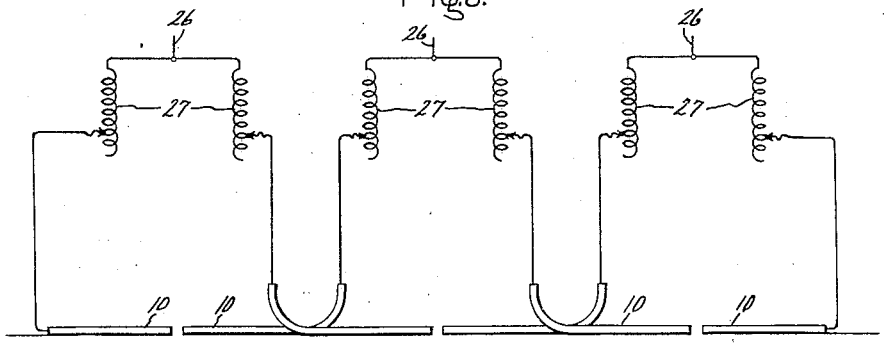

Patented Feb. 7, 1939

2,146,600

UNITED STATES PATENT OFFICE 2,146,600

ARC WELDING

Gareth G. Somerville, Pittsfield, Mass., assignor to General Electric Company, a corporation of New York Application October 23, 1936, Serial No. 107,185

4 Claims. (Cl. 219—10)

My invention relates to arc welding and more particularly to that type of arc welding in which the welding operation proceeds automatically in accordance with the consumption of an electrode which is applied to the work parallel to the line of welding with its end in arcing engagement with the work. For convenience, this type of arc welding is often referred to as "self-operating" in view of the fact that the welding operation proceeds automatically once the welding arc has been started at the end of the electrode and the electrode has been properly positioned along the line of welding.

When employing the self-operating process of welding, the welding current is supplied through the electrode. Heretofore unless the welding current was supplied to the arc through a comparatively long length of electrode it was not possible to employ the process for welding seams of great length if a substantially uniform continuous weld was required. The welding electrode employed is usually provided with a flux coating which not only positions the electrode within arcing distance of the work, but also serves to control the welding arc and provides when fused a slag covering which protects the weld from the surrounding atmosphere and improves the quality of the deposited metal. When using a flux coated electrode of considerable length the supply of current through the electrode generates sufficient heat to disintegrate the flux coating and to interfere consequently with the successful performance of the self-operating process of welding.

It is an object of my invention to provide an improved procedure by means of which short lengths of electrodes are employed for performing long lengths of welding by the self-operating process at greatly increased operating speeds.

It is a further object of my invention to provide a procedure by means of which a polyphase source of alternating current may be employed for performing self-operating welding operations.

It is another object of my invention to provide a procedure for controlling the width and penetration of a weld made by the self-operating process of welding.

Further objects of my invention will become apparent from a consideration of the following description taken in connection with the accompanying drawings and its scope will be pointed out in the appended claims.

In the drawings, Figs. 1 and 2 are side and end views of a welding apparatus embodying my invention; Figs. 3, 4, 5 and 8 are diagrams illustrating several uses of polyphase alternating current sources of supply within the scope of my invention; and Figs. 6 and 7 are details showing electrode holders useful for practicing my invention.

I have discovered that a uniform weld of great length may be made with the self-operating process of welding by positioning on the work along the line of welding two electrodes the adjacent inner ends of which are within arcing distance of one another and the outer ends of which are connected to a source of welding current of sufficient voltage to maintain two arcs in series with one another and then initiating the welding operation by striking an arc between the adjacent inner ends of these electrodes. This initiating arc with the consumption of the electrodes drops to the work and divides into two series connected arcs which move away from one another along the line of welding as the electrodes are consumed. Due to the action of the arcs upon the work no crater is formed in the work at the point of starting. Each arc directs molten weld metal toward the other and produces at the point of starting a uniform weld which extends in each direction from the point of starting. It is apparent that by using two electrodes to form a single continuous weld in accordance with my discovery that the length of a continuous weld obtainable when using the self-operating process of welding is twice that of the electrodes used and is obtained at twice the welding speed obtainable with heretofore proposed methods of welding with the self-operating process. By using a polyphase source of current which is connected to a plurality of electrodes which are simultaneously consumed by a plurality of pairs of series connected arcs, as well as described in detail below, it is possible to obtain still greater speeds of welding By resorting to particular electrode connections, also described below, it is possible to obtain with a polyphase source of current welds of uniform quality the total length of which is the combined lengths of the electrodes which are connected to the polyphase source of supply.

In Figs. 1 and 2 of the drawings I have diagrammatically illustrated a welding machine capable of performing welding operations where the length of the weld is twice the length of the electrodes used. In these figures two flux coated electrodes 10 are supported with their bared end portions resting on electrode holders 11 which are offset from the work 12 and slightly elevated above its surface. The flux coated portion of the electrodes is biased into arcing engagement with the work by plungers 13 which engage the electrodes at points between the electrode holders and the work. These plungers are forced into engagement with the electrodes through the agency of springs 14 reacting on supports 15 which form a part of the frame structure of the welding machine. The electrode holders are formed of electrically conductive material and each is connected to a terminal 16 of a source of welding current which must be of sufficient voltage to maintain two series connected arcs with the desired flow of welding current. The electrode holders 11 are electrically insulated from the frame structure of the machine by insulating members 17 positioned between these holders and the frame structure of the machine.

In Fig. 1 of the drawings the behavior of the welding arcs and the flow of weld metal has been indicated. It will be noted that no crater is formed at the point where the welding operation was initiated between the inner adjacent ends of the electrode. It will also be noted that the flux coating on each electrode forms a hood over the arc which directs the arc downward and to a great extent prevents the spatter of electrode material. A hood of the character illustrated is obtained by using an electrode having an eccentric flux coating which is placed on the work with the thinner portion of the coating against the work. The same result may be obtained by the use of a flux coating next to the work that is consumed at a greater rate than the flux coating located more remotely from the work.

I have also discovered that it is possible to control the width of the weld and its penetration into the work by the use of cupreous bars having work-engaging portions of restricted section forming dams for the deposited metal on each side of the electrode and by the use of a grooved backing member having a work-engaging surface of low heat conductivity.

In Figs. 1 and 2 of the drawings the cupreous bars are shown at 18 and the grooved backing member at 19. The bars 18 are attached to supports 20 which also act as supports for the electrode holders 13. These bars have edged portions of restricted section which engage the work at opposite sides of the electrodes and constitute dams for holding in place on the work the weld metal deposited from the electrodes and melted from the work. These bars also limit the activity of the arc in a lateral direction thus controlling its penetrating qualities. By controlling the distance the work engaging portions of these bars are spaced from one another, it is possible to obtain welds of desired width and penetration.

The action of these bars is assisted by the use of the grooved backing member 19 which is located with its grooved portion 21 on the other side of the work below the welding electrodes. The bottom of the grooved portion may be formed by a copper bar 22 which is supported between the work engaging surface portions 23 of the bar. These work engaging surface portions are made of low heat conductivity by providing them with a plurality of grooves 24 which greatly limit the surface area of the backing member in engagement with the work. With this construction it is apparent that most of the heat must travel from the arc through the work parts instead of passing from the work parts into the backing member. It is because of this restricted heat transfer to the backing member that the degree of penetration of the weld into the work is effectively controlled.

The relative sizes of electrodes, work and clamping bars have been distorted in the drawings for purposes of illustrating the behavior of the welding arcs on the weld metal. I have found that the following spacings of the dams for different electrode sizes and plate thicknesses give the best results.

| Plate thickness in inches | Electrode diameter in inches | Spacing of dam edges in inches |
|---|---|---|
| ⅛ | 3⁄16<br>¼ | ⅜<br>9⁄16 |
| ¼ | ¼<br>5⁄16 | 9⁄16<br>9⁄16–⅝ |
| ½ | 5⁄16<br>⅜ | ⅝<br>⅝ |

In order to prevent the formation of craters at the outer ends of the weld, strips of metal 25 may be attached at each end at the line of welding, and the welding operation interrupted after the welding arcs have traveled on to these strips which are subsequently broken from the work.

The apparatus of Figs. 1 and 2 constitutes the subject matter of my divisional application, Serial No. 143,315 for Arc welding apparatus, filed May 18, 1937.

In Figs. 1 and 2 the source of welding current is preferably a single phase alternating current. It is, however, possible to use polyphase alternating current and various connections that may be employed when using a polyphase source of welding current are illustrated in Figs. 3, 4, 5 and 8.

In these figures a three phase source of supply 26 has been indicated. In Fig. 3, two of the terminals of the source have been connected to the outer ends of electrodes 10 and the third terminal has been connected to the work 12. In Fig. 4, two of the terminals of the polyphase source have been connected to the outer ends of two electrodes positioned at the ends of the line of welding and the third terminal of the source has been connected to the midpoint of an electrode of twice the length of the previously mentioned electrodes which is positioned intermediate them along the middle portion of the line of welding. In Fig. 5 each of the terminals of the polyphase source of supply is connected to the midpoints of three electrodes of the same length initially arranged with their adjacent ends within arcing distance of one another.

With the arrangement shown in Fig. 3 the speed of welding is essentially the same as that obtained when using the connections illustrated in Fig. 1. However, by connecting one terminal of the source of supply 26 to the work it is possible to obtain more penetration and for this reason the connections illustrated in Fig. 3 may often times prove more desirable than those disclosed in Fig. 1. In Figs. 4 and 5 the arrangements are essentially the same as those disclosed in Fig. 1. The advantage of using the connection shown in Figs. 4 and 5 results, however, from the greater speeds of welding. Since in Fig. 4 four arcs are employed and in Fig. 5 six arcs are employed the speeds of welding with the connections of Figs. 4 and 5 are respectively two and three times the speeds of welding obtained when using the connections of Figs. 1 and 3.

Unless some provision is made for eliminating the crater formation occurring at the points of connections of the electrodes with the source of supply where these points of connection occur intermediate the ends of the weld, it will not be possible to secure a uniform weld. These craters can be eliminated by crossing the connection ends of the electrodes positioned intermediate the ends of the line of welding as shown in Fig. 8. According to the connections illustrated in Fig. 8, pairs of electrodes 10 are connected through separate substantially equal inductances 27, which may be provided with iron cores, to each terminal of the source of supply 26 and the electrodes are so arranged relative to one another that the pairs of electrodes connected to one terminal of the source of supply 26 are each in a different series circuit with the other terminals of the source of supply. The electrodes located intermediate the ends of the line of welding are provided with turned-up end portions at their connection ends which cross one another as illustrated. By reason of this cross connection the welding arcs traveling toward one another cross in their paths of travel and thus avoid the formation of the craters above referred to. When employing the connection arrangement of Fig. 8, it is possible to produce a weld of uniform quality and of great length when using electrodes whose length is limited by their ability to carry the welding current desired without destroying their flux coatings.

In Figs. 6 and 7, I have illustrated two electrode holders which may be used when performing the polyphase welding operations above referred to.

The holder illustrated in Fig. 7 may be used for the connections of Fig. 8. It has a yoke 28 carrying the electrode clamps 29 which are connected to the source of supply through conductors 30. This yoke 28 and the electrode supported thereby are biased into engagement with the work through the agency of a spring 31 located between a support 32 and the plunger 33 which is attached to the yoke 28.

The electrode holder of Fig. 6 may be used when continuity of weld uniformity is not essential. This holder comprises an insulating support 40 in which the bared end portions of the electrodes 10 are supported. The support 40 may be mounted directly on the work. The fluxed portions of the electrodes are biased into arcing engagement with the work through the agency of plungers 34 which engage the bared portions of the electrodes adjacent the support 40. These plungers are forced toward the work by springs 35 located between adjusting nuts 36 on the plungers, and a yoke 37 through which the plungers extend. The ends of the plungers are connected to the terminals of a source of supply 38 which is connected through these plungers to the electrodes 10 at the bared portions thereof with which the plungers make engagement. The plunger yoke 37 is mounted on a support 39 forming a part of the welding apparatus.

In view of the description of my invention above given it is apparent to those skilled in the art that various modifications other than those illustrated may be employed without departing from the spirit and scope thereof and I consequently intend to cover in the appended claims all those modifications of my invention which fall within the true spirit and scope thereof.

What I claim as new and desire to secure by Letters Patent of the United States, is:

1. The method of electric arc welding which comprises applying to the work along the line of welding a plurality of electrodes extending in opposite directions relatively to one another with their sides within arcing distance of the work and with their adjacent ends within arcing distance of one another, connecting to said electrodes a source of welding current of sufficiently high voltage to maintain two arcs in series circuit with one another, and initiating the welding operation by striking between the adjacent ends of said electrodes an arc which subsequently engages the work and divides into a pair of series connected arcs that travel away from one another along the line of welding to the connections with said source of welding current.

2. The method of electric arc welding which comprises applying to the work parallel to the line of welding pairs of electrodes the inner ends of which are initially within arcing distance of one another and the work and the outer ends of which in intermediate positions along the line of welding cross one another within arcing distance of the work, connecting to the outer ends of each pair of electrodes a source of polyphase current of sufficient voltage to maintain two arcs in series circuit with one another, initiating the welding operation by striking between the inner ends of said pairs of electrodes arcs which subsequently engage the work and divide into pairs of series connected arcs, and continuing the welding operation until the welding arcs moving toward one another along the line of welding cross in their paths of travel at the outer ends of said electrodes in intermediate positions along the line of welding.

3. The method of electric arc welding which comprises applying to the work parallel to the line of welding pairs of electrodes extending in opposite directions relatively to one another with their sides within arcing distance of the work and with their inner ends initially within arcing distance of one another, connecting each terminal of a polyphase source of alternating current of sufficient voltage to maintain two arcs in series circuit with one another to the outer ends of a plurality of said electrodes each of which is of a different pair and each of which is connected in series circuit with the other electrode of its pair to a different terminal of said source, and initiating the welding operation by striking between the inner ends of said pairs of electrodes arcs which subsequently engage the work and divide into pairs of series connected arcs.

4. The method of electric arc welding which comprises applying to the work parallel to the line of welding pairs of electrodes the inner ends of which are initially within arcing distance of one another and the outer ends of which in intermediate positions along the line of welding cross one another within arcing distance of the work, connecting each terminal of a polyphase source of alternating current of sufficient voltage to maintain two arcs in series circuit with one another to the outer ends of a plurality of said electrodes each of which is of a different pair and each of which is connected in series circuit with the other electrode of its pair to a different terminal of said source, initiating the welding operation by striking between the inner ends of said pairs of electrodes arcs which subsequently engage the work and divide into pairs of series connected arcs, and continuing the welding operation until the welding arcs moving toward one another cross in their paths of travel where the outer ends of said electrodes cross one another in intermediate positions along the line of welding.

GARETH G. SOMERVILLE.